Dec. 29, 1931.  J. W. HOOLEY  1,838,515

SECTIONAL CABINET FOR ELECTRICAL CONNECTIONS

Filed March 12, 1931

Inventor
John W. Hooley
by
A. W. Harrison
Attorney

Patented Dec. 29, 1931

1,838,515

UNITED STATES PATENT OFFICE

JOHN W. HOOLEY, OF LARCHMONT, NEW YORK, ASSIGNOR TO HIXLEY ELECTRIC COMPANY, OF NEW YORK, N. Y., A CORPORATION OF NEW YORK

SECTIONAL CABINET FOR ELECTRICAL CONNECTIONS

Application filed March 12, 1931. Serial No. 521,949.

This invention relates to boxes or cabinets for the accommodation and reception of panel boards, distributing boards, switch boards, interconnection boxes for signal systems such as telephones, bells, and any board that may be used for distributing light and power, wiring connections or wires or conductors.

At present those interested in electrical work such as electrical engineers, manufacturers and underwriters, limit the number of conductors in conduits, and such conductors are held to this limitation until they enter a panel or connection box, or so-called pull box or junction box. Then the conductors are generally crossed and run in haphazard manner in order to make connections to the circuit protecting or other devices in the panel cabinet.

With the advance of electrical work, particularly in the alternating current fields, a common neutral may be employed for a multiple of phases or circuits, as for example in a three phase four wire system, the fourth wire would be the neutral wire to the other three wires.

An improved multiple circuit electrical distributing device for use in overcoming objections or difficulties encountered in making such installations as referred to, is described and claimed in Letters Patent No. 1,796,521 issued to me March 17, 1931, and one of the objects of the present invention is to provide sectionalized cabinets having free raceways for the wiring, and in which raceways liability of wiring being caught is precluded. This object is attained by providing a space for the wiring which space is divided into a plurality of raceways the side walls of which comprise overlapping members whereby, if said space is varied in depth, no crevices will exist through which wiring might pass from one raceway to another.

Another object of my invention is to provide an improved cabinet of the character referred to, which cabinet is provided with a neutral bar or conductor supported by sectionalizing barriers and insulated therefrom.

With the above objects in view, and others hereinafter explained, the invention consists in the construction of the cabinet, and the combinations of the parts thereof, substantially as hereinafter described and claimed.

Of the accompanying drawings:—

Similar reference characters indicate similar parts or features in all of the views.

Figure 1:
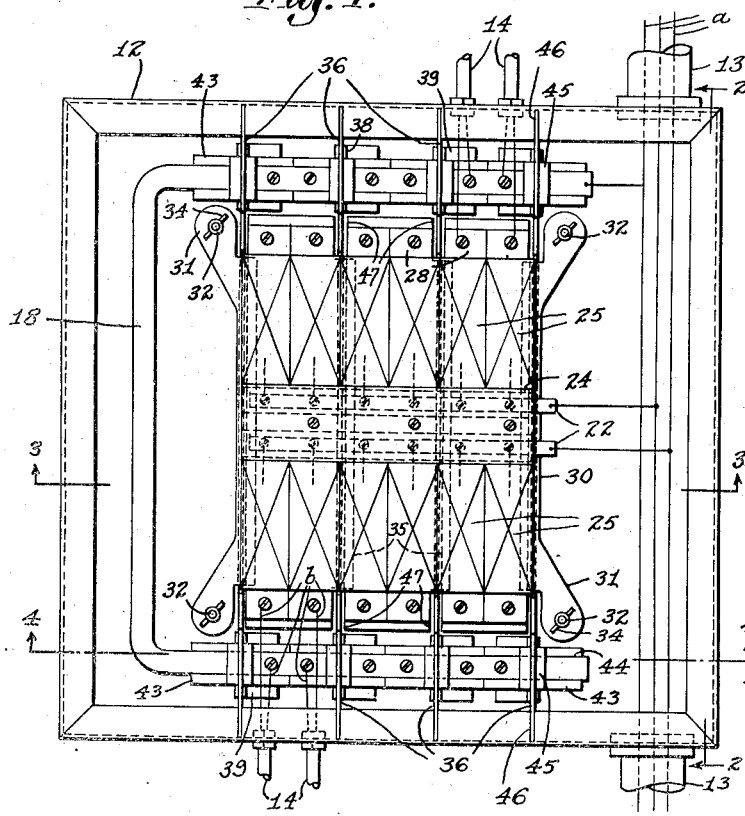
Figure 1 is a front elevation of my improved cabinet in one of its forms, the usual front door or panel thereof being omitted.

The cabinet or box 12, of suitable material such as sheet steel, is illustrated as having conduits 13 for the main feeders or conductors a a, and branch conduits 14 connected thereto in any suitable manner.

Mounted in the cabinet as hereinafter described is a bar or strip 18 to serve as the neutral or common wire conductor, said bar having a multiplicity of binding screws or other suitable means for connecting the conductors thereto. Said bar 18 automatically provides a permanent ground connection for the conductors which are connected thereto.

Bus bars 22 are mounted under a cover plate 24 which is supported by a division plate 26, said bars being connected with the circuit-controlling or protection devices which are diagramatically illustrated at 25 and which are associated with the contact plates or strips 28 to which the wiring b b is connected, so as to automatically make the proper connections when said devices 25 are fitted to place.

With the exception of the mounting of the neutral bar 18 as hereinafter described, the parts or members so far referred to are or may be the same as the parts having the same reference characters in the Patent No. 1,796,521 hereinbefore referred to.

The devices 25 which may be of any well-known or preferred character, are removably secured to a supporting plate 30 which is adjustably mounted in the cabinet so that, if the cabinet is mounted in a recess in a wall in other than correct vertical plane, or not properly flush with the wall, the said plate 30 and the devices 25 carried thereby may be adjusted to correct position. To provide for such adjustment, the plate 30 has its corner portions 31 provided with apertures to fit over threaded studs 32 projecting from the rear wall of the cabinet, supporting nuts 33 and wing nuts 34 which fit the studs enabling the plate 30 to be secured in desired position relatively to the rear wall of the cabinet.

Figure 3:
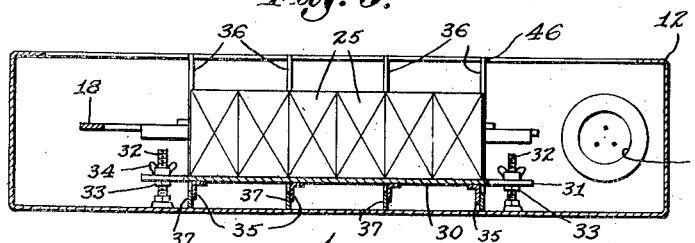
Figure 3 represents a section on line 3—3 of Figure 1.

In my improved cabinet or box the space between the plate 30 and the rear wall is utilized to provide a series of free raceways for the wiring connections. To avoid liability of any wiring getting from one raceway into another, I provide the rear surface of the plate 30 with partitioning strips 35 (Fig. 3) which closely overlap the portions 37 of the barrier or division strips presently described, the extent of such overlapping being sufficient to prevent adjustment of the plate 30 resulting in the existence of crevices through which wiring might pass from one raceway into another. Preferably the strips 35 are angular in cross section and welded to the rear surface of the plate 30.

Figure 2:
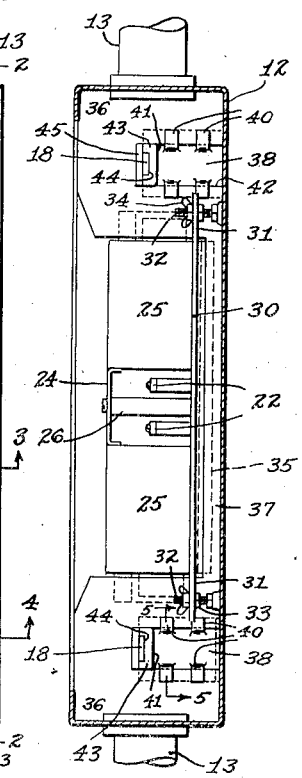
Figure 2 represents a section on line 2—2 of Figure 1.
Figure 5:
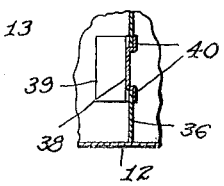
Figure 5 represents a section on line 5—5 of Figure 2.

As best illustrated in Figure 2, the sheet metal division or barrier strips are not of uniform width from end to end, but have wide end portions 36 connected by narrow portions 37 which latter coact with the strips 35 as above described. Each end portion 36 has a rectangular recess 42 extending in from its rear edge to cooperate with a flat lug 38 the base 39 of which is secured, as by welding, to the rear wall of the cabinet. Each of said lugs 38 has bent side ears 40 so shaped that when a barrier strip 36, 37, is slipped to position in the cabinet, the side edges of its two recesses 42 will slide between the ears 40 and the other side edge portions of the two lugs 38 (Fig. 5).

Figure 4:
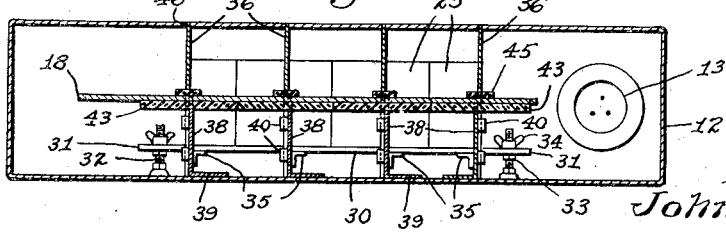
Figure 4 represents a section on line 4—4 of Figure 1.

The structure just described provides for mounting the neutral bar 18 in an insulated position. To this end, the upper edge of each lug 38 has a recess 41 (Fig. 2) in which is mounted a strip 43 of insulating material such as porcelain, said strip 43 being longitudinally recessed as at 44. The several strips 43 are in line with each other as illustrated in Figures 1 and 4, and the neutral bar 18 lies in the recesses 44 thereof. Interposed between the upper surface of the neutral bar 18 and the edges of the recesses 42 in the barrier strip portions 36 are small blocks 45 of insulating material such as porcelain. This structure provides for supporting the neutral bar by the barrier strips and still insulated therefrom.

When the box or cabinet has an inwardly extending front flange, such flange is slitted as at 46 (Fig. 1) to enable the barrier or division strips 36, 37, to be inserted to position when the parts are being assembled. After assembly, such sealing is effected, as by welding, to maintain the barrier strips in position.

As illustrated in Figures 1 and 2, the area of the plate 30 which supports the electrical devices is greater than the distance between the upper and lower portions 36 of the barrier strips. Therefore the upper and lower edges of said plate have notches 47 into which said portions 36 project.

As the cabinet is illustrated in upright position, parts or members thereof are referred to herein by such terms as upper, lower and rear. It is to be understood that such terms are employed simply for convenience of description and without limiting intent. If the cabinet is mounted in other than upright position, different but properly descriptive terms would apply.

Having now described my invention, I claim:—

1. A cabinet having a back wall and a plate spaced therefrom, said wall and plate having overlapping partitioning members to provide isolated raceways between said plate and wall, and means for adjusting the distance of said plate from the back wall.

2. A cabinet having a back wall and a plate spaced therefrom, said wall and plate having a plurality of overlapping strips providing isolated raceways for conductors, and means for adjusting said plate toward and from the back wall.

3. A cabinet having a back wall and a plate spaced therefrom, said wall and plate having overlapping partitioning members to provide isolated raceways between said plate and wall, means for adjusting the distance of said plate from the back wall, and a series of electrical mechanisms or devices supported by said plate.

4. A cabinet having a back wall and a plate adjustable toward and from the back wall for supporting electrical mechanisms, said plate having a plurality of parallel strips projecting from its rear surface, and barriers mounted in the cabinet, portions of said barriers closely overlapping said strips to provide closed raceways.

5. A cabinet having barrier strips providing spaces for a plurality of electrical mechanisms, and a neutral or common wire conductor for the circuits of said mechanisms, said conductor being supported by said barrier strips.

6. A cabinet having barrier strips providing spaces for a plurality of electrical mechanisms, and a neutral or common wire conductor for the circuits of said mechanisms, said conductor extending through and insulated from said barrier strips.

7. A cabinet having an adjustable plate for supporting a plurality of electrical mechanisms, barrier strips having end portions beyond the opposite margins of said plate, and a neutral or common wire conductor supported by and insulated from said end portions of the barrier strips.

In testimony whereof I have affixed my signature.

JOHN W. HOOLEY.